(12) United States Patent  (10) Patent No.: US 7,772,142 B2
Kawano et al.  (45) Date of Patent: Aug. 10, 2010

(54) PROTECTIVE MATERIAL, LINING, EDGE COVER, AND PACKING TAPE

(75) Inventors: Koji Kawano, Tokyo (JP); Nobuyoshi Shimura, Tokyo (JP)

(73) Assignee: Major Corporation, Tokyo (JP)

( * ) Notice: Subject to any disclaimer, the term of this patent is extended or adjusted under 35 U.S.C. 154(b) by 7 days.

(21) Appl. No.: 12/083,149

(22) PCT Filed: Jun. 29, 2006

(86) PCT No.: PCT/JP2006/313010

§ 371 (c)(1),
(2), (4) Date: Oct. 2, 2008

(87) PCT Pub. No.: WO2007/043218

PCT Pub. Date: Apr. 19, 2007

(65) Prior Publication Data

US 2009/0068906 A1  Mar. 12, 2009

(30) Foreign Application Priority Data

Oct. 6, 2005  (JP) ............................. 2005-293823

(51) Int. Cl.
*D03D 15/00* (2006.01)
*F41H 1/02* (2006.01)
(52) U.S. Cl. ................. 442/229; 442/6; 2/2.5
(58) Field of Classification Search ............ 442/6, 442/229, 134, 135
See application file for complete search history.

(56) References Cited

U.S. PATENT DOCUMENTS

| 6,133,169 A | 10/2000 | Chiou et al. |
| 2003/0176129 A1 | 9/2003 | Vanassche et al. |
| 2004/0084197 A1* | 5/2004 | Bortz ............. 174/35 R |
| 2005/0059307 A1* | 3/2005 | Moeseke ............. 442/134 |

FOREIGN PATENT DOCUMENTS

| JP | A-61-261039 | 11/1986 |
| JP | A-62-183790 | 8/1987 |
| JP | A-01-244299 | 9/1989 |
| JP | A-1-244299 | 9/1989 |
| JP | B2-7-31038 | 4/1995 |
| JP | U-7-44240 | 11/1995 |
| JP | A-09-042894 | 2/1997 |
| JP | A-2000-198159 | 7/2000 |
| JP | A-2002-506966 | 3/2002 |
| JP | A-2002-161459 | 6/2002 |
| JP | A-2003-532807 | 11/2003 |
| JP | A-2004-245510 | 9/2004 |
| JP | U-3119241 | 1/2006 |
| WO | WO 99/47880 A1 | 9/1999 |
| WO | WO 01/86046 A1 | 11/2001 |

* cited by examiner

*Primary Examiner*—Lynda Salvatore
(74) *Attorney, Agent, or Firm*—Oliff & Berridge, PLC (57) ABSTRACT

In a protective material (liner, edge cover, and packing tape) formed by laminating a metal mesh and sheets, even if inexpensive sheets instead of high-strength fiber sheets are used, the integration between the sheets and the metal mesh is increased, the stitches of the metal mesh are prevented from misaligned, and sufficient cut resistance is provided.

2 Claims, 10 Drawing Sheets

PROTECTIVE MATERIAL, LINING, EDGE COVER, AND PACKING TAPE

CROSS-REFERENCE TO RELATED APPLICATION

This application is the U.S. National Stage of PCT/JP2006/313010, filed Jun. 29, 2006, which claims priority from JP2005-293823, filed Oct. 6, 2005, the entire disclosure of which is incorporated herein by reference hereto.

BACKGROUND

The present disclosure relates to a sheet-like protective material.

Figure 9:
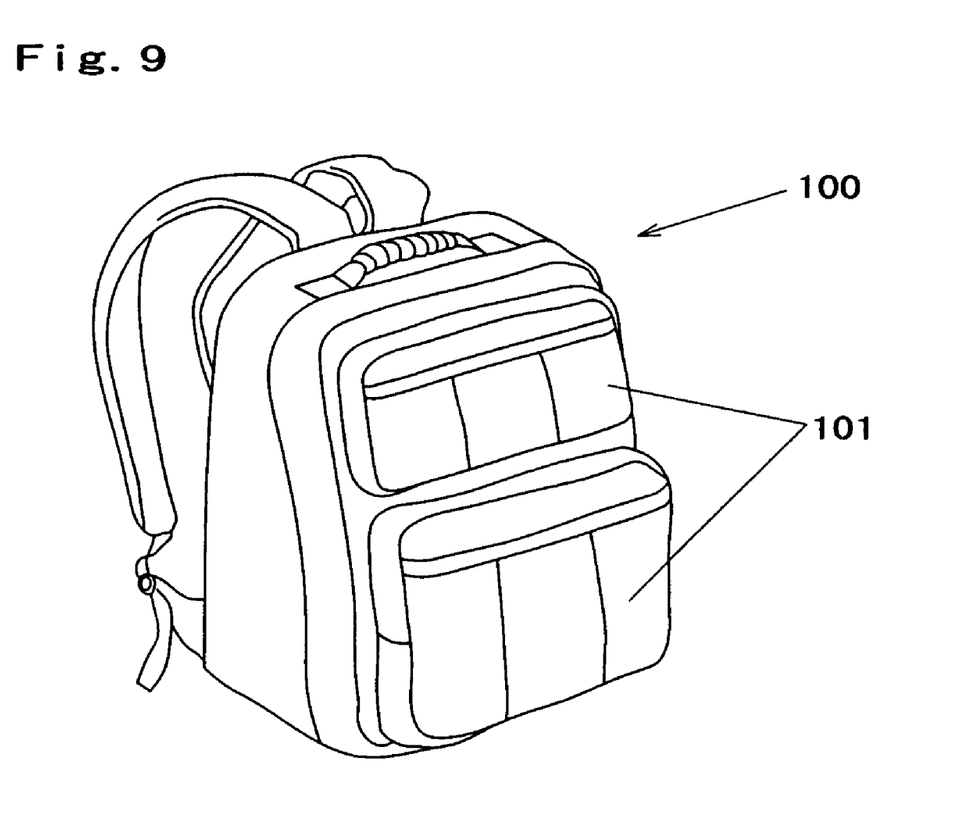
FIG. 9 is a perspective view of a conventional backpack.
Figures 10A, 10B:
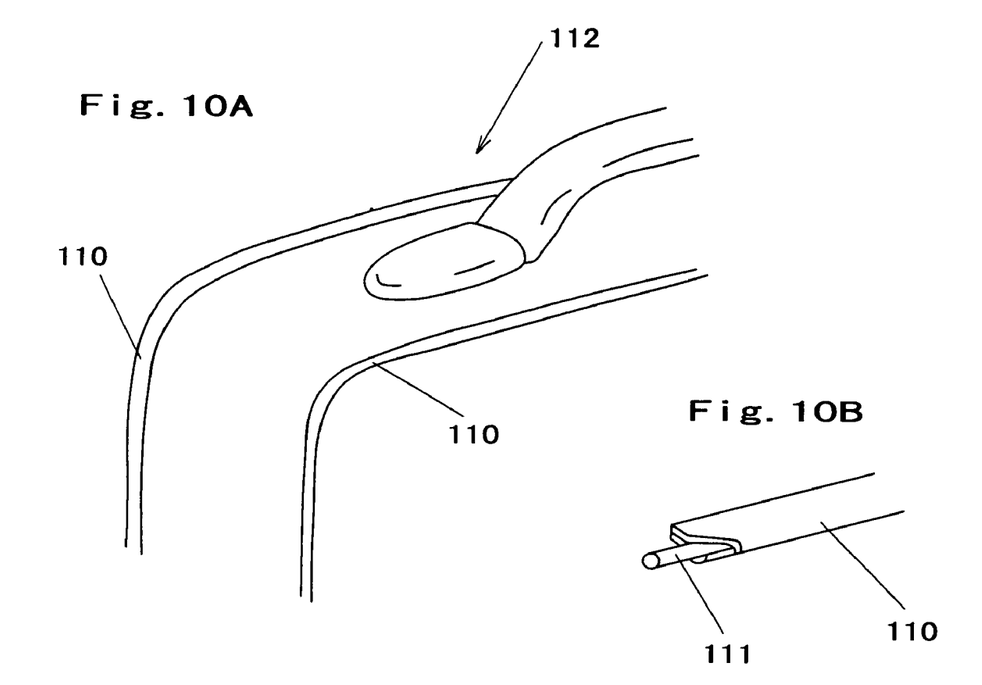
FIG. 10A is a partial perspective view of a conventional bag.
FIG. 10B is a partial sectional perspective view of an edge of a conventional bag.
Figure 10C:
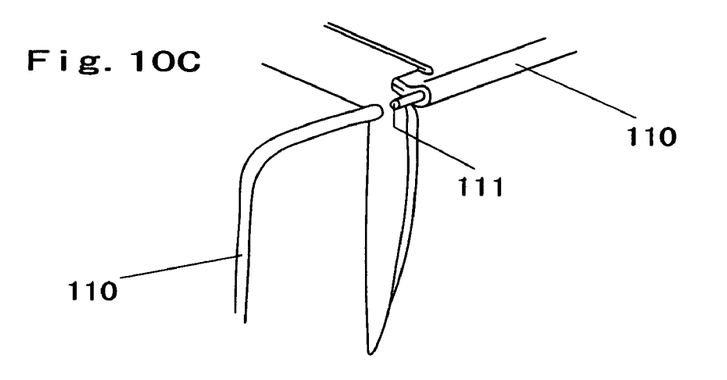
FIG. 10C is a perspective view of a section of an edge portion of a conventional bag.

There occur an increasing number of thefts by using a knife or a cutter. For example, there is an case where a wallet is stolen from a front pocket 101 of a backpack 100 shown in FIG. 9 when the pocket 101 is cut with a cutter or the like. As shown in FIG. 10A, even a bag 112 that has an edge 110 so as to be reinforced by piping 111 (see FIGS. 10B and 10C) is relatively easy to cut with a cutter. Such a bag is thus one of the theft targets. In another case where a plurality of goods are bundled with a conventional packing tape and displayed for sale at a shop, the packing tape is often cut with a cutter, and some of the goods are stolen.

There exists a proposed protective material that is formed by laminating a metal mesh and a flexible material together. The protective material includes a lamination of a sheet-like metal mesh that is formed by weaving metal fibers and a flexible material that is formed by weaving high-strength fibers (see Japanese Published Unexamined Patent Application No. 1995-31038, for example). When such a protective material is used for a liner or an edge cover of a bag, or for a packing tape, it surely can be a good protection against thefts by using a knife or a cutter because the protective material is highly cut-resistant.

SUMMARY

The protective material by weaving high-strength fibers (for example, an aramid fiber sheet) is, however, generally more expensive than sheets of polyurethane foam and natural rubber. When such a protective material is applied to a liner and an edge cover of a bag, there is a great increase in cost. In order to overcome this problem, a protective material can be used that is formed by laminating a metal mesh and an inexpensive flexible material instead of the high-strength fibers. Simply laminating the flexible material and metal mesh together, however, cannot make the protective material highly cut-resistance. When a degree of integration between the flexible material and the metal mesh is low, a stitch alignment of the metal mesh can easily be off. The cut-resistant of such a protective material is thus unsatisfactory.

The present disclosure solves the above-mentioned problems and is also able to achieve to various advantages. That is, the present disclosure is to provide a protective material, a liner, an edge cover, and a packing tape that are highly improved in integration quality between a flexible material and a metal mesh so that stitches of the metal mesh can be prevented from being misaligned and is satisfactorily cut-resistant even if inexpensive flexible materials, instead of high-strength fibers, are used for the protective material.

The disclosure addresses an exemplary aspect of a sheet-like protective material in which a sheet-like metal mesh that is formed by weaving metal fibers is sandwiched by flexible materials that are capable of following the metal mesh on both front and back surfaces of the metal mesh from front and back sides of the metal mesh so as to be integrated with each other.

In another exemplary aspect, the flexible materials are integrated by sticking to each other.

In another exemplary aspect, the flexible materials are integrated by bonding with each other.

In another exemplary aspect, the flexible materials are integrated by chemically combining with each other.

In another exemplary aspect, the flexible materials are polyurethane foam.

In another exemplary aspect, the metal mesh is stab-resistant.

In another exemplary aspect, being made of the protective materials, a liner can be provided so as to overlap a back surface of a cloth.

In another exemplary aspect, being made of the protective materials, an edge cover can be provided so as to cover sewn portions of a cloth.

In another exemplary aspect, being made of the protective materials, a packing tape can be provided that packages items.

According to various exemplary aspects, even if the protective material is repeatedly bent and deformed, the metal mesh does not warp between the flexible materials, and the protective material does not swell.

According to various exemplary aspects, the integration can be made reliable.

According to various exemplary aspects, the protective materials can be manufactured inexpensively and easily.

According to various exemplary aspects, the protective material is stab-resistant as well as cut-resistant.

According to various exemplary aspects, the liner can be manufactured light in weight and cost-savingly.

According to various exemplary aspects, the edge cover can easily be formed so as to be cut-resistant.

According to various exemplary aspects, the packing tape is effective against thefts by using cutters or knives.

According to various exemplary aspects, even if inexpensive flexible materials other than high-strength fiber sheets are used in order to form the protective material, the integration between the flexible material sheets and the metal mesh can be improved, misalignment of the metal meshes can be avoided, and the protective material can be provided so as to be sufficiently cut-resistant.

BRIEF DESCRIPTION OF THE DRAWINGS

Various embodiments of the disclosure will be described with reference to the drawings, wherein.

DESCRIPTION OF SYMBOLS

1: protective material
2: metal mesh
3: flexible material
4: adhesive sheet
4a: directly stuck portion
5: protective material
6: stab-resistant member
S: aperture

DETAILED DESCRIPTION OF EMBODIMENTS

Figure 1A:
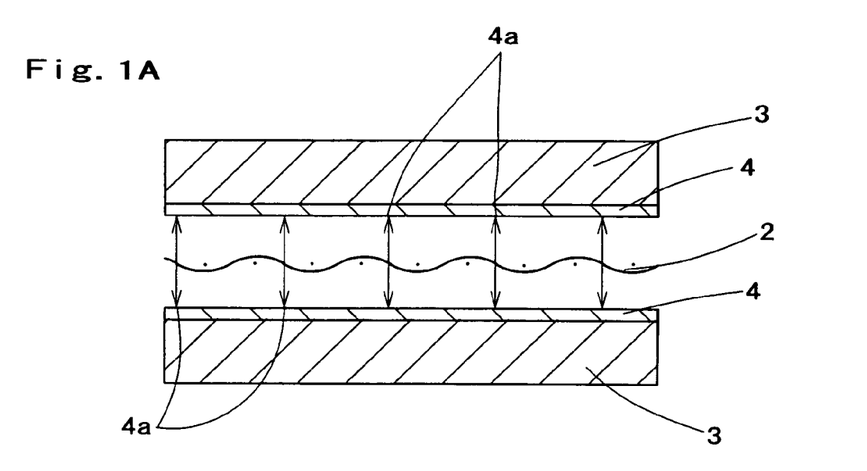
FIG. 1A is a longitudinal sectional view of the metal mesh.

Next, embodiments of the present disclosure will be described based on the drawings. In FIG. 1C, reference numeral 1 denotes a protective material for a cut-resistant feature against a knife, a cutter, and the like. The protective material 1 includes a metal mesh 2 that is cut-resistant against a cutting tool; and flexible materials 3 that are closely attached to both front and back surfaces of the metal mesh 2 (see FIGS. 1A, 1B, 1C, 3, 4, and 5).

Figure 1B:
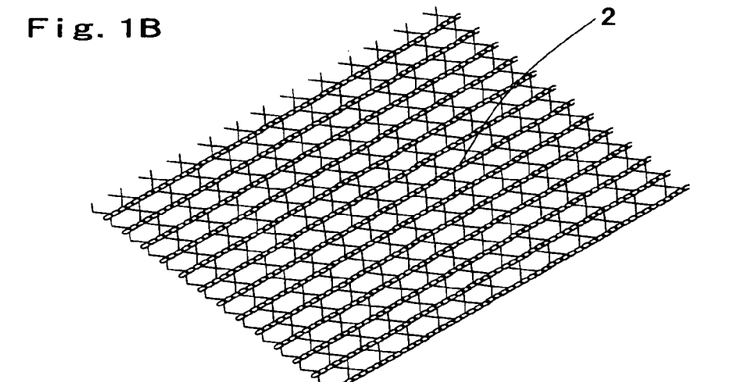
FIG. 1B is a perspective view of the metal mesh.
Figure 1C:
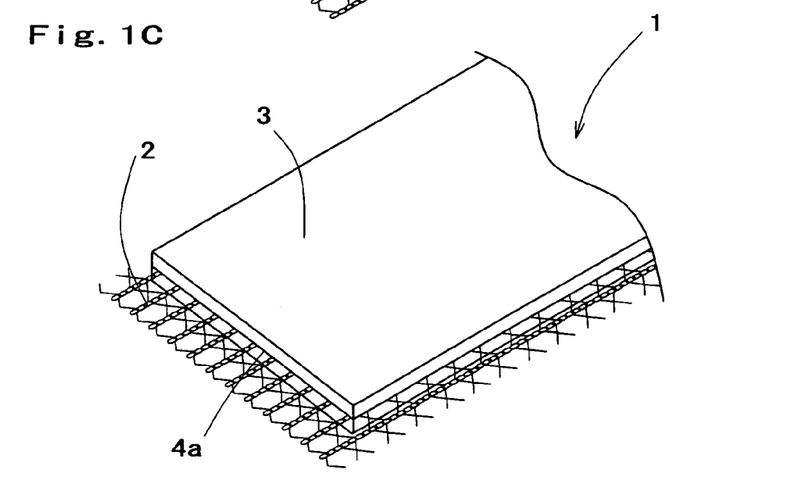
FIG. 1C is a perspective view of the protective material.

The metal mesh 2 is formed so as to be meshed (reticulated) by weaving metallic fibers or threads (in this embodiment, 0.1±0.03 mm in diameter), such as stainless steel, titanium, aluminum, or carbon steel, according to such various known weaving methods as flat knitting, warp knitting, circular knitting, etc (see FIG. 1B). Preferably, each size and interval of the meshed portions of the metal mesh 2 is formed in a few millimeters so as to allow surfaces of the flexible materials 3 to directly stick to each other through the meshed portions while sandwiching the metal mesh 2 from the front and the back sides the metal mesh 2 (see FIGS. 1A, 1B, and 1C).

The flexible materials 3 can be made of a flexible material, such as a natural resin, a synthetic resin, natural rubber, or synthetic rubber. In this embodiment, each of the flexible materials 3 is made of flexible polyurethane foam.

The reference numeral 4 denotes an adhesive sheet by which the flexible materials 3 and the metal mesh 2 are attached to each other. The adhesive sheet 4 is formed by coating such a glue as rubber-based elastomer or an acrylic resin on both surfaces of polyester resin or polyvinyl chloride, etc.

The protective material 1 is formed by sticking the flexible materials 3 to the front and the back surfaces of the metal mesh 2 via the adhesive sheets 4. The adhesive sheets 4 are stuck to both the flexible materials 3 and the metal mesh 2. The adhesive sheets 4 are also directly stuck to each other through the meshed portions while sandwiching the metal mesh 2 from the front and the back sides of the metal mesh 2.

The reference numeral 4a denotes directly-stuck portions at which portions of the adhesive sheets 4 are directly stuck to each other (see FIGS. 1A and 1C). The directly stuck portions 4a are formed such that the portions of the adhesive sheets 4 penetrate the metal mesh 2 through the meshed portions that are perforated from front and back surfaces of the metal mesh 2. As shown in FIG. 1A, between the adhesive sheets 4 that faces with each other while sandwiching the metal mesh 2, the portions of the adhesive sheets 4, as indicated by arrows, are directly stuck to each other. The directly stuck portions 4a are thus formed.

For the flexible materials 3, polyurethane foam is used. The polyurethane foam is manufactured by mixing and chemically reacting a polyisocyanato compound [(—NCO) n compound] with a resin compound that has two or more active hydrogens of —OH or —NH, etc. Sheet-like polyurethane foams that are manufactured in advance can be stuck to each other by using a double-sided adhesive sheet 4. In order to obtain a greater adhesion, preferably, the double-sided adhesive sheets 4 are stuck to both front and back of the polyurethane foams, respectively, and the double-sided adhesive sheets are stuck to each other while sandwiching the metal mesh 2 (see FIG. 1A). Sufficient adhesion can also be obtained if the double-sided adhesive sheet is stuck to one side of the polyurethane foam and then stuck to the other side of the polyurethane foam while sandwiching the metal mesh 2.

In the embodiment of the present disclosure constructed as described above, the protective material 1 is formed such that the flexible materials 3 are stuck to the front side and the back side of the metal mesh 2. The highly cut-resistant metal mesh 2 and the flexible materials 3 can be integrated and stuck to each other such that the flexible materials 3 can follow the metal mesh 2. Accordingly, unlike the conventional technique, neither misalignment nor swell of the cutting-resistant mesh sheet occurs. In addition, the flexible materials 3 are made of polyurethane foam, which is an inexpensive material, so that the manufacturing cost of the protective material 1 can be reduced. Furthermore, the metal mesh 2 and the flexible materials 3 are stuck to each other by the adhesive sheets 4 so that the metal mesh 2 can reliably fit into the flexible materials 3 while being closely stuck to the flexible materials 3.

Method of integrating the front and the back flexible materials is not limited to sticking. Adhesion by an adhesive agent can be used for the integration, such as a physical adhesion by drying a solvent or an adhesion by a chemical reaction. More specifically, a polyurethane sheet 3 is laid as a lower surface and the metal mesh 2 is placed thereon, and from above the metal mesh 2, a polyurethane foam reaction liquid is discharged in order to integrate the front and back foams. The adhesive sheets 4 are thus unnecessary because a chemical adhesion is performed. In another example, the protective material 1 can also be manufactured by discharging a polyurethane foam reaction liquid on a lower surface, placing the metal mesh 2 thereon, and discharging another polyurethane foam reaction liquid from above. Another chemical adhesion is thus performed.

Figure 2A:
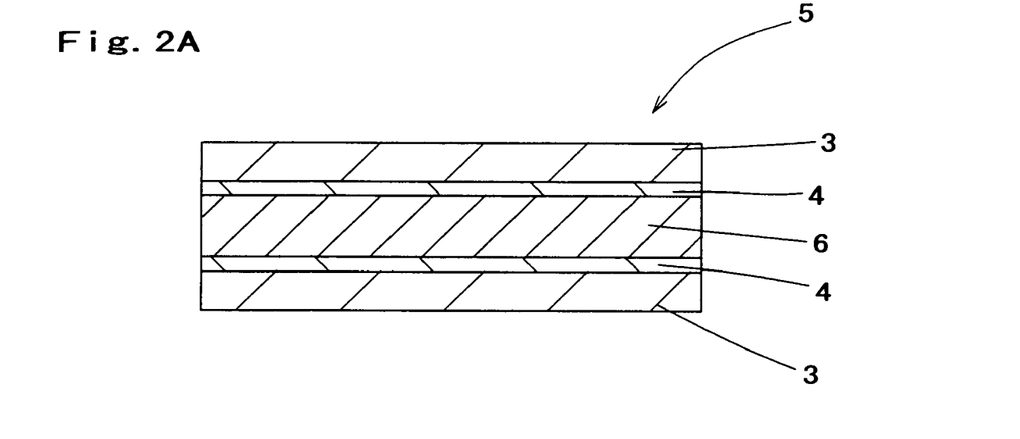
FIG. 2A is a longitudinal sectional view of a second embodiment.
Figure 2B:
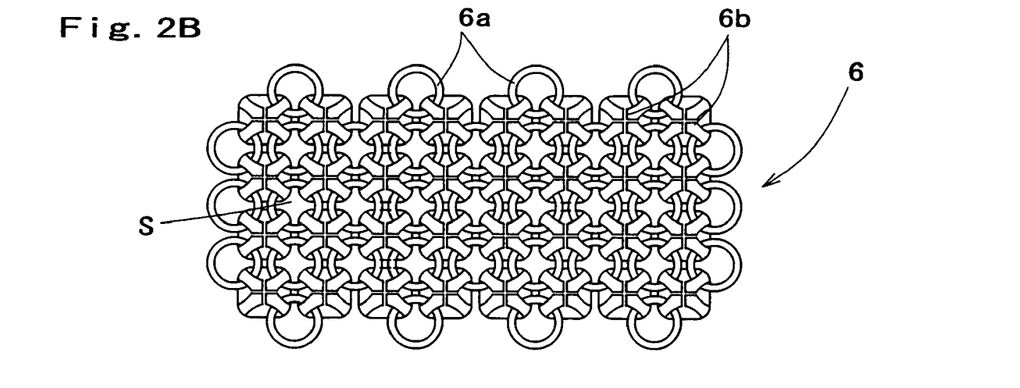
FIG. 2B is a back view of a stab-resistant member.
Figure 2C:
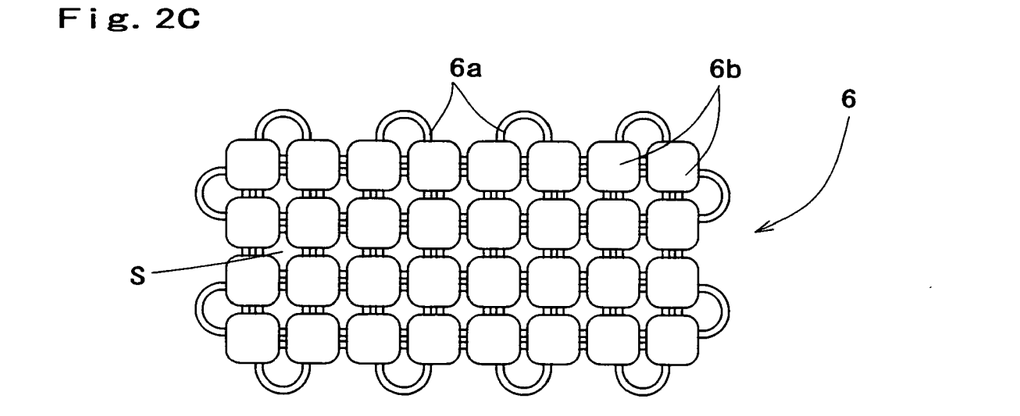
FIG. 2C is a front view of the stab-resistant member.

As a second embodiment shown in FIGS. 2A, 2B, and 2C, the present disclosure can further be carried out. The protective material 5 has a stab-resistant member 6 that is constructed so as to be resistant to stabbing of weapons like a spear. While being sandwiched and fixed between the flexible materials 3 via the adhesive sheets 4, the stab-resistant member 6 constitutes the protective material 5. The protective material 5 is thus cut- and stab-resistant.

The stab-resistant member 6 of the second embodiment, as shown in FIGS. 2B and 2C, is formed by joining together a plurality of rings 6a and a plurality of supports 6b whose leg portions that extends from corners of square shapes are inserted into the rings 6a so as to support the rings 6a. The joined portions are freely bendable and have narrow apertures S. Front and back surfaces of the flexible materials 3 thus can be integrated with each other through the apertures S. Accordingly, even if a cutting tool is used to stab the stab-resistant member 6, the apertures S prevents the cutting tool from penetrating and resists against the stabbing. As a matter of course, the stab-resistant member 6 is not limited to the above-described construction. Any construction is possible as long as the member is stab-resistant.

Figure 3:
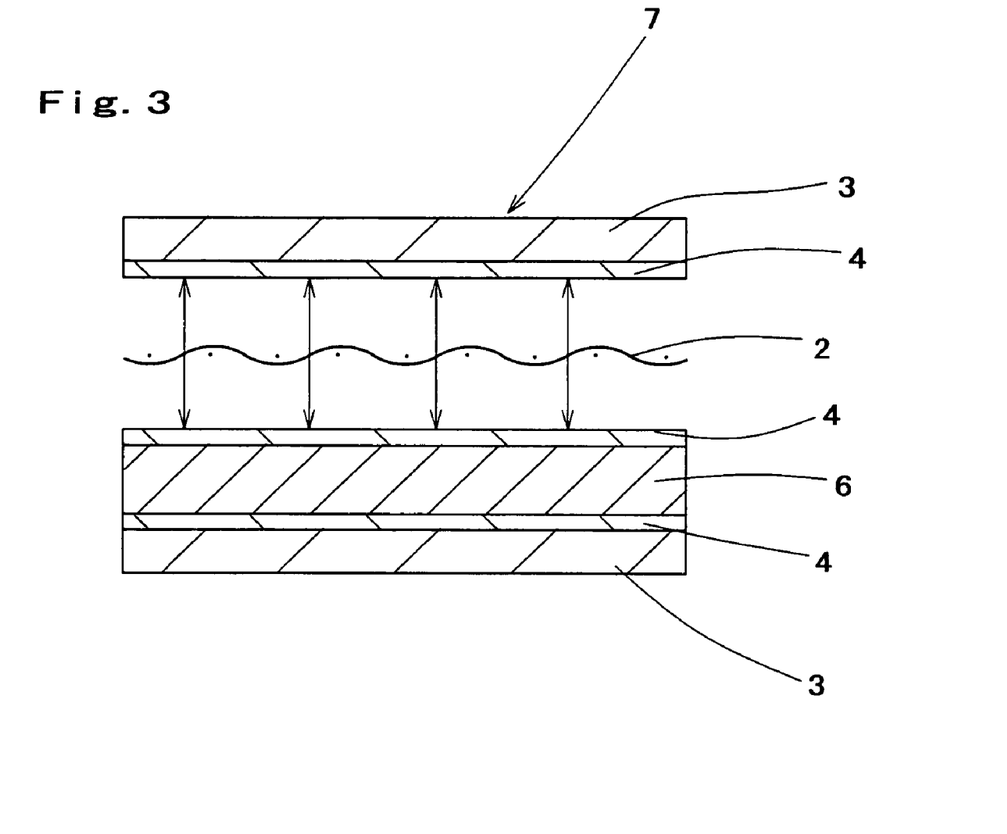
FIG. 3 is a longitudinal sectional view of a third embodiment.

As a third embodiment shown in FIG. 3, a protective material 7 can be formed such that the flexible materials 3 sandwiches the stab-resistant member 6 and the metal mesh 2 that are stuck with the adhesive sheets 4. The protective material 7 can thus be highly cut- and stab-resistant. Portions indicated by arrows between the adhesive sheets 4 that face with each other are the directly stuck portions 4a (see FIG. 3).

Figure 4:
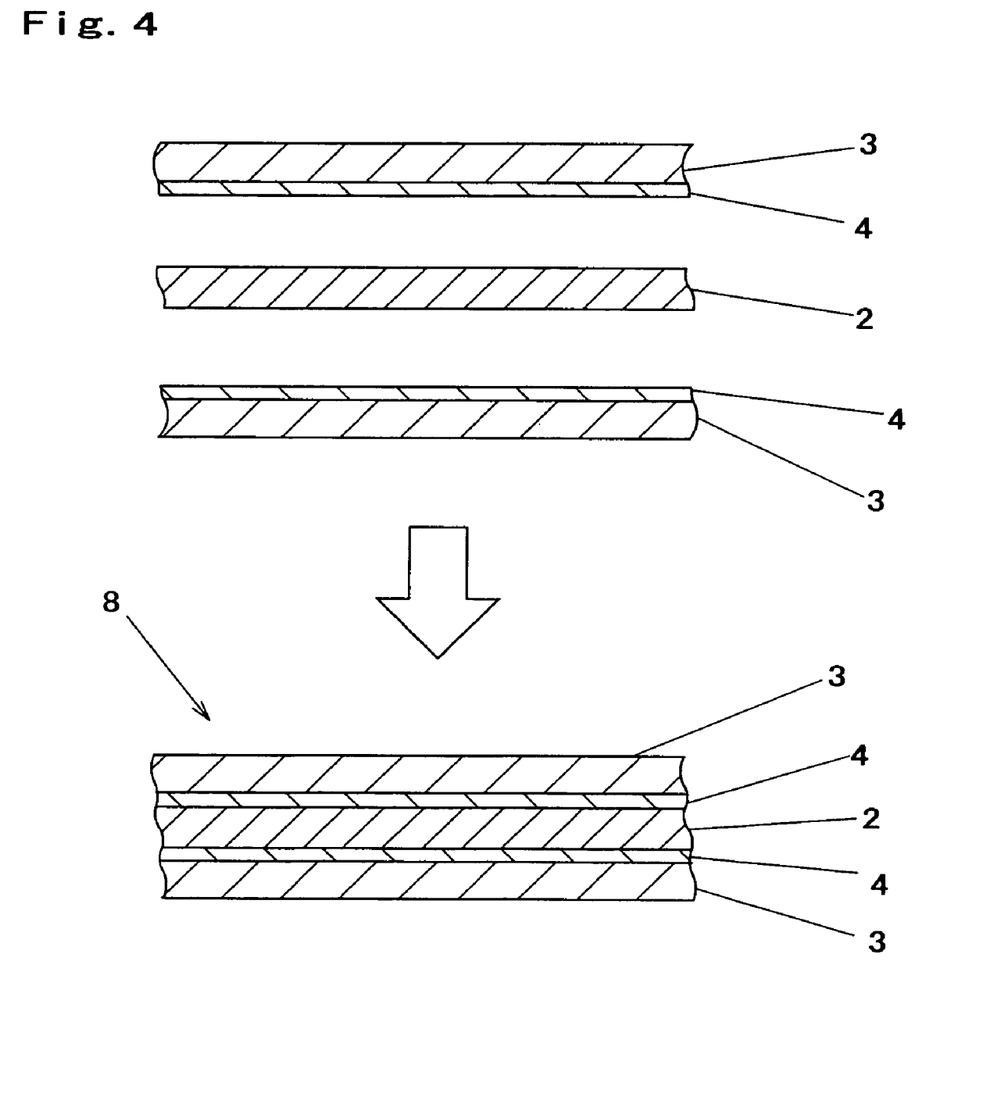
FIG. 4 is a sectional view of a protective material of a fourth embodiment.
Figure 5:
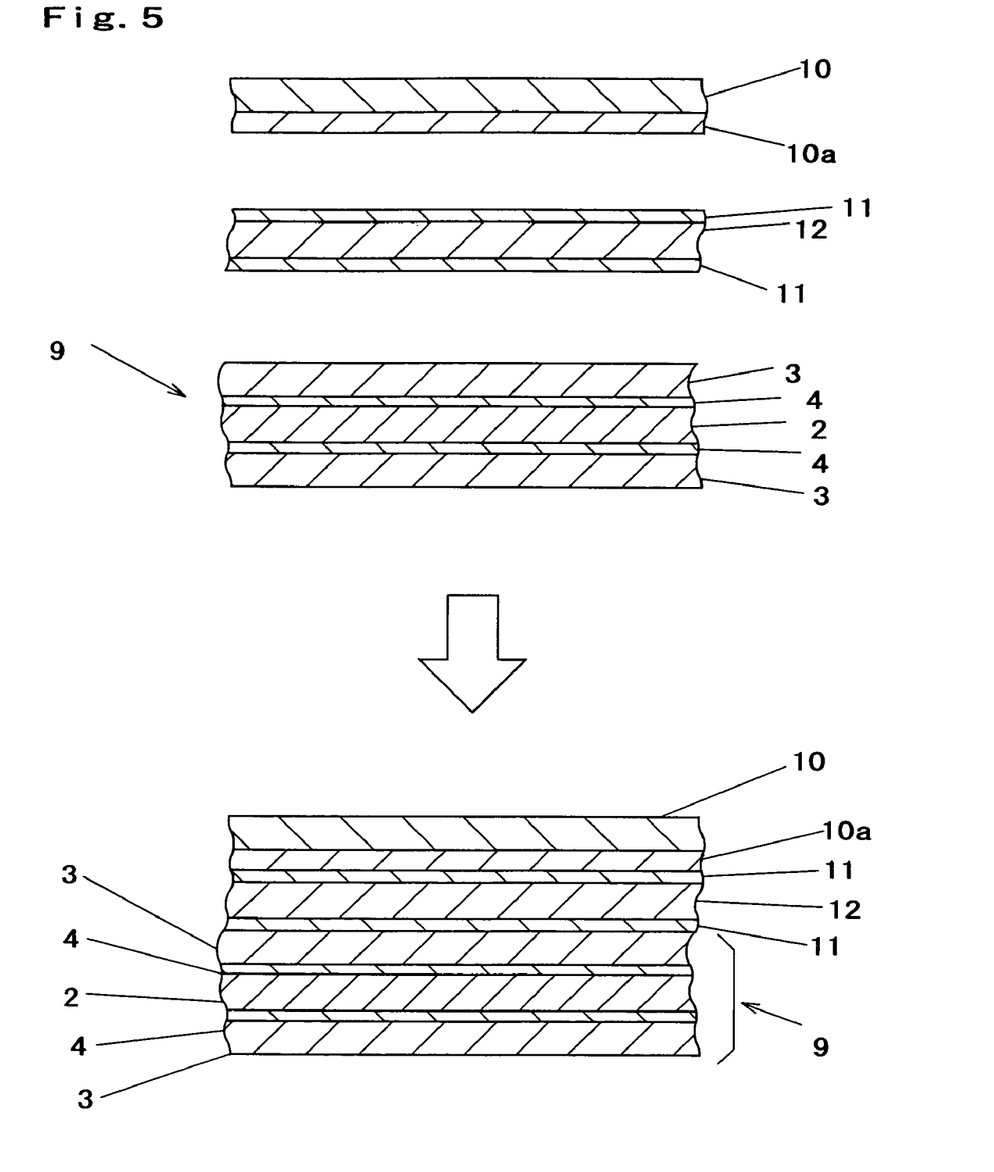
FIG. 5 is a sectional view showing a fifth embodiment.

As a fourth embodiment shown in FIG. 4, a protective material 8 is formed by using a sheet-like metal mesh 2, which is formed by weaving metal fibers, and flexible materials (adhesive films) 3 that have adhesive layers 4 on at least one of surfaces. In the fourth embodiment, in order for the protective material 8 to be used as a liner sheet and adjust to stretch of a clothing fabric, which is described later, the protective material 8 is formed by using a mesh sheet that is formed to have honeycomb hexagonal openings with a 3-mm diameter by knitting ultrafine stainless steel wires (0.1±0.03 mm in diameter) as the metal mesh 2, urethane sheets with a thickness of 1.5 mm as the flexible materials 3, and a glue that is composed mainly of polyethylene terephthalate (PET) as an agent. The material of the metal fibers that forms the metal mesh 2 is not limited. An iron wire, a lead wire, a brass wire, and wires of titanium, aluminum, and carbon steel can also be used, for example. The forming method is also not limited. Weaving such as flat knitting, warp knitting, and circular knitting, or ring-like meshing can be applied. In addition, the metal fiber thickness and orientation can also be selected according to a balance of a required cut resistance, weight, and cost.

As a sheet material of the flexible material 3, a PET adhesive thin-film sheet, a PVC film, a jersey, a canvas (cotton), nylon, leather, polyvinyl chloride, a polyester resin, a natural resin, a synthetic resin, a natural rubber, a synthetic rubber, and flexible polyurethane foam can also be used. As a gluing material that forms the adhesive layers 4, chloroprene rubber, natural rubber-based materials, glue, and silicon-based materials can also be selected as desired.

The protective material 8 of the present disclosure is formed by sandwiching the metal mesh 2 between the flexible materials 3 so that the adhesive layers 4 are in contact with both front and back surfaces of the metal mesh 2. According to the protective material 8 thus formed, the metal mesh 2 and the front and the back flexible materials 3 are well integrated. Permanence without separation of the integration can be secured. The front and the back adhesive layers 4 effectively prevent the stitches of the metal mesh 2 from being misaligned. Sufficient cut resistance can thus be secured. Because the flexible materials 3 are stuck to each other via the stitches of the metal mesh 2, a further firm integration can also be secured.

In the embodiment of the present disclosure constructed as described above, because the protective material 8 is formed by sandwiching the metal mesh 2 between the flexible materials 3, cut resistance depends does not only on the metal mesh 2. The cut resistance can instead be based on the integrally stiffened three-layered structure, i.e., the flexible material 3—the metal mesh 2—the flexible material 3. In addition, a mesh sheet that is made of ultrafine stainless steel wires, and is light in weight, thin, and inexpensive can be applied to the metal mesh 2. The protective materials can thus be handled similar to general cloths or fabrics in workability of sewing. Application of the protective material 8 thus can be widely expanded as being required to have properties of cut resistance. Preferably being used as an liner, an edge cover, an packing tape, and the like, the examples of use of the protective material 8 will be hereinafter described with reference to the drawings.

As a fifth embodiment of the present disclosure shown in FIG. 2, a liner 9 has the same sectional construction that the protective material 1 in FIG. 1A has. As a matter of course, materials of the metal mesh 2 and the flexible materials 3, both of which constitute the liner 9, can be changed in stretch and rigidity properties according to required features of the liner 9. A method of attaching the liner 9 to a back surface of a cloth 10 can be selected arbitrarily. For example, when the cloth 10 has an urethane coating layer 10a on its back surface, the liner 9 (adhesive sheet 3) and the cloth 10 can be joined together (stuck to each other) via a double-sided adhesive sheet 12—a glue can be coated thereon—that has adhesive layers 11 on both front and back surfaces of the double-sided adhesive sheet 12.

The liner 9 of the embodiment of the present disclosure constructed as described above can be preferably used as a liner of the cloth 10 that is used for a bag, for example. Applied to the backpack 100 as shown in FIG. 9, for example, the liner 9 can be joined to a back surface of the cloth in whole or in part. As being sewn by the same sewing work as in the case of conventional liners, the liner 9 can be handled quite easily. The liner 9 also provides the backpack 100 in whole or part with excellent cut-resistant features. When the liner 4 is applied to a part of the cloth of the backpack 100, the applied part is preferably the front pocket 101 of the backpack 100. Accordingly, minimized increases of weight and cost can be secured, and at the same time, fundamental protective features against knives and cutters are also secured.

Figure 6A:
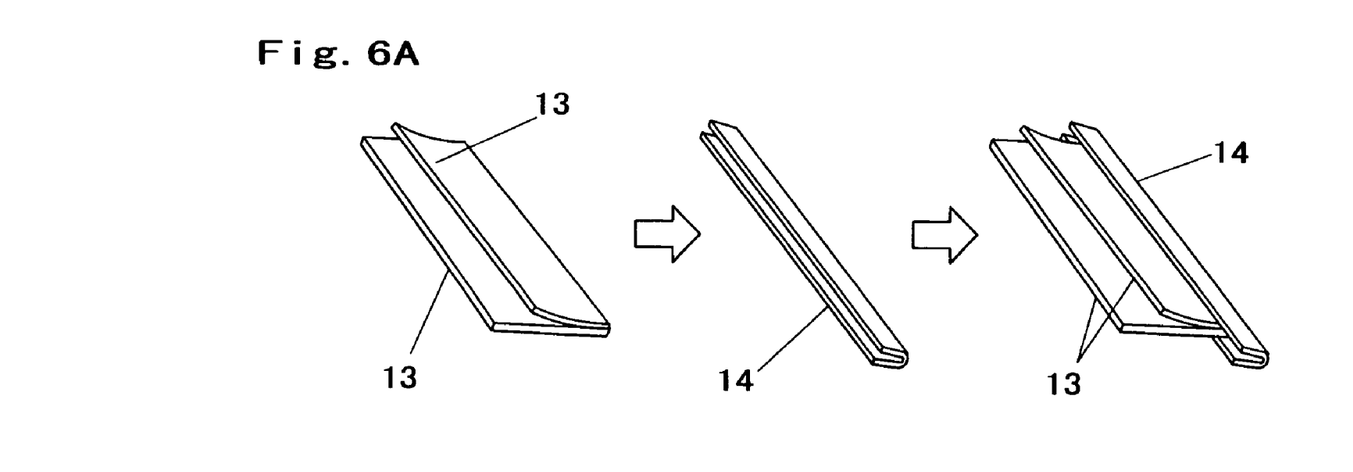
FIG. 6A is an explanatory view of conventional edging steps and FIG. 6B is an explanatory view of a sixth embodiment.
Figure 6B:
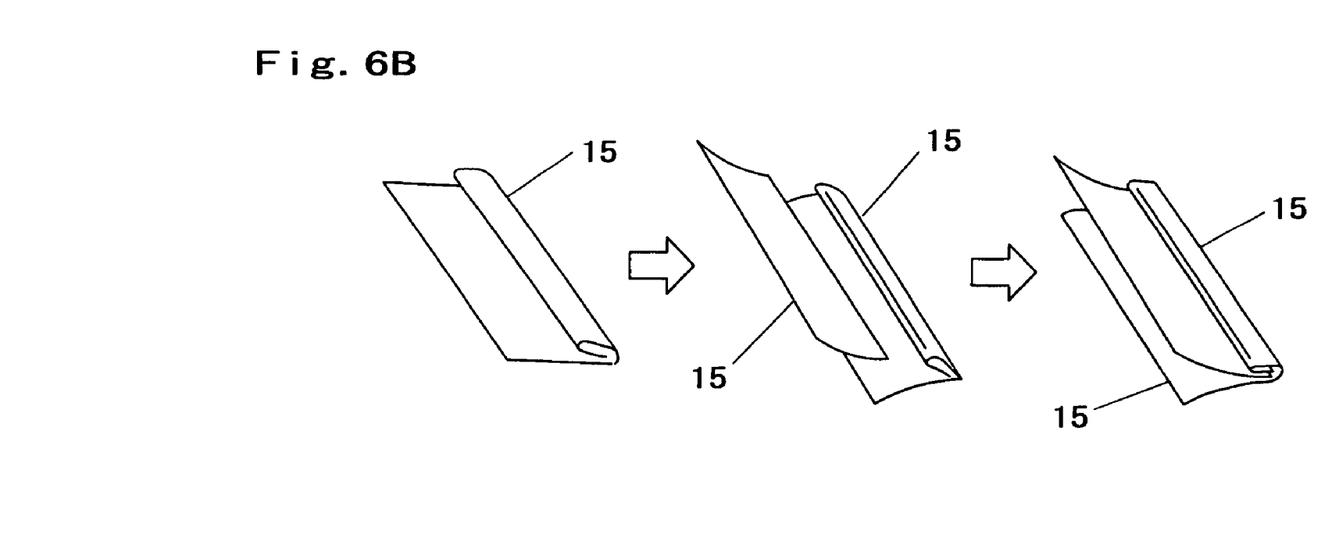

As a sixth embodiment shown in FIG. 6B, a traditional edge cover is unnecessary when the cloth 10, to which the liner 9 of this embodiment is joined, is used. Conventionally, as shown in FIG. 6A, in order to sew two pieces of cloth 13 together, a sewn portion must first be covered by an edge cover 14. In contrast, when the cloths 10, to which the liners 9 of this embodiment are joined, are sewn, one end of one cloth 10 is folded twice, and then the other cloth 10 is inserted into the folded portion so as to be sewn together. This sewing work can be performed in the same manner as in the case of the conventional liner. More specifically, when the present embodiment is applied as described above, the traditional edge cover 14 is unnecessary, and the edge processing is simplified further. The cost can thus be reduced significantly.

Figures 7A, 7B:
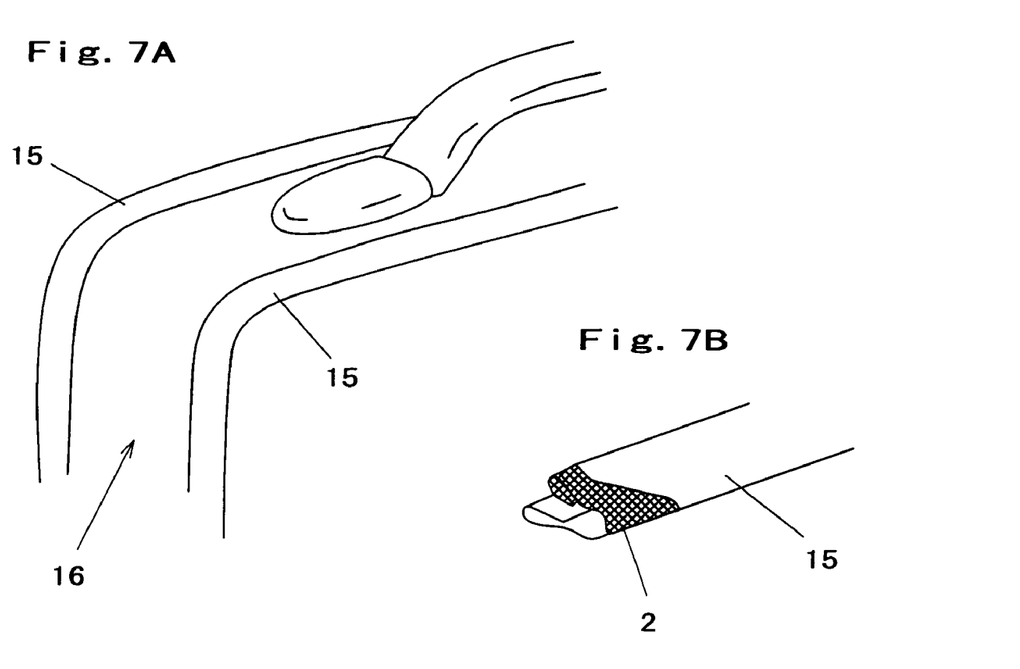
FIG. 7A is a partial perspective view of a bag showing an example of use of the sixth embodiment.
FIG. 7B is a perspective view of an edge cover of the sixth embodiment.
Figure 7C:
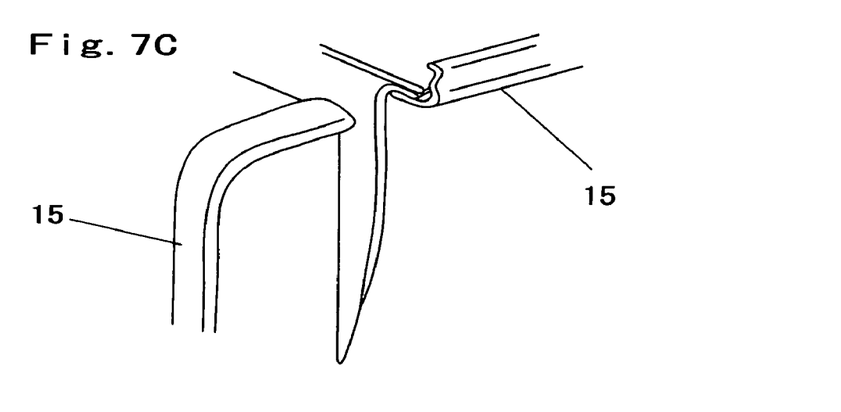
FIG. 7C is a sectional perspective view of an edge portion of the sixth embodiment.

As the sixth embodiment shown in FIGS. 7A, 7B, and 7C, an edge cover 15 has the same sectional construction that the protective material 8 in FIG. 4 has. As a matter of course, materials of the metal mesh 2 and the adhesive sheets 3, both of which constitutes the edge cover 15, can be changed according to performance required for the edge cover 15.

The edge cover 15 of the embodiment of the present disclosure constructed as described above can be preferably used as an edge cover that covers a sewn portion of a bag, for example. When the edge cover 15 is applied to a bag 16 shown in FIG. 7A, a fabric sewn portion is just sandwiched by the edge cover 15 from an outside so as to be sewn together. The edge portion of the bag 16 can be provided with an excellent look and cut resistance (see FIGS. 7B and 7C). In addition, by using the edge cover 15 of this embodiment, extra reinforcement, such as piping, is unnecessary. Because the manufacturing process can be simplified, the cost can be reduced.

Figure 8:
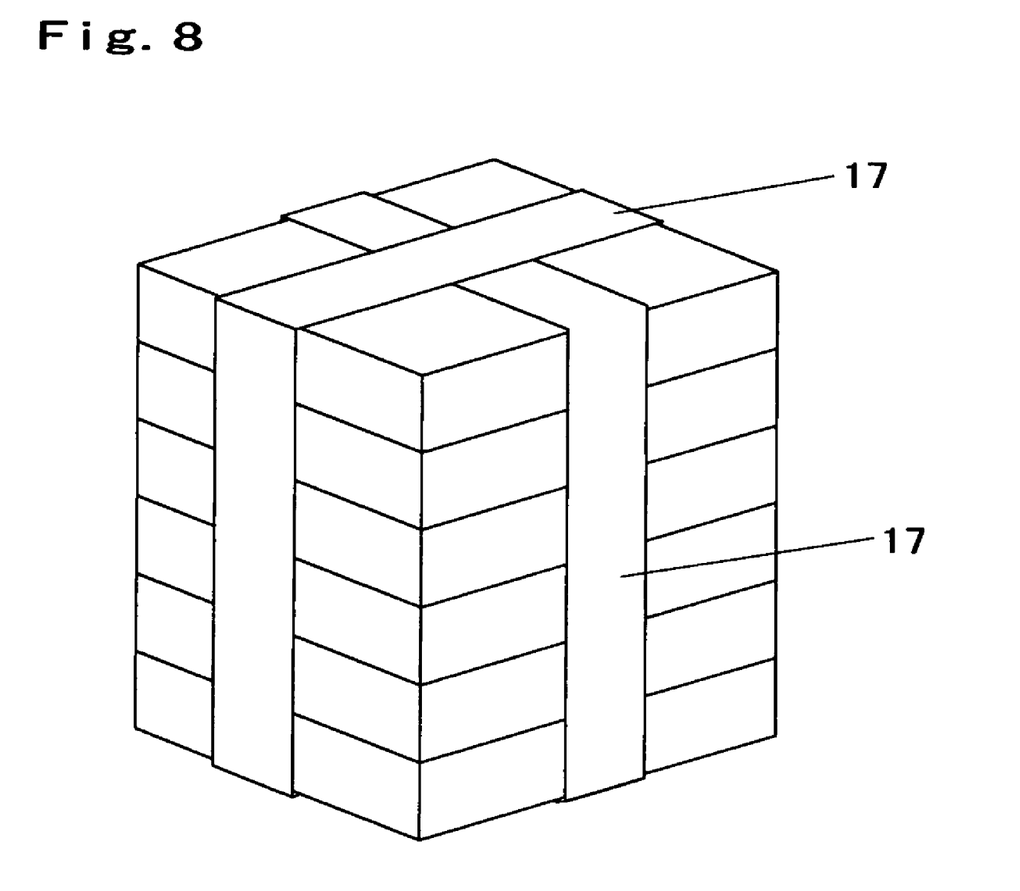
FIG. 8 is a perspective view showing an example of use of a packing tape of a seventh embodiment.

As a seventh embodiment of the present disclosure shown in FIG. 8, a packing tape 17 has the same sectional construction that the protective material 8 in FIG. 4 has. As a matter of course, materials of the metal mesh 2 and the adhesive sheets 3, both of which constitutes the packing tape 17, can be changed according to required performance of the packing tape 17.

The packing tape 17 of the embodiment of the present disclosure constructed as described above can be preferably used as a packing tape that bundles items. For example, in a sales technique in which a plurality of items are bundled with a packing tape and displayed for sale as shown in FIG. 8, the packing tape 17 of the present disclosure can be of use when applied. Because the packing tape 17 is provided with excellent cut resistance, the bundle of the items with the package tape 17 is provided with protective performance against thefts. That is, the items of the bundle are thus difficult to steal by cutting the package tape loose.

The present disclosure is not limited to the above-described embodiments. Although preferable and exemplary uses of the protective materials are illustrated as the liner, the edge cover, and the packing tape, the protective materials are also applicable to various other uses that are required to have excellent cut resistance.

The protective material 1 of the present disclosure relates to a sheet-like protective material having excellent cut resistance. In particular, the protective material 1 is applied to a liner and an edge cover of a bag and a backpack, a packing tape, and a bottom of a shoe and slipper, preferably.

What is claimed is:
1. A sheet-like protective material, comprising:
   a stab-resistant member that includes:
      a plurality of rings, and
      a plurality of square-shaped supports, each support including a leg portion that extends inward from each corner of the support, wherein each ring is connected with a plurality of leg portions in order to join the plurality of rings in a matrix state with the plurality of supports; and
   a plurality of flexible materials, including a first flexible material and a second flexible material, wherein:
      the first flexible material is placed on a first surface of the stab-resistant member and the second flexible material is placed on a second surface of the stab-resistant member opposite the first surface, and
      the first flexible material contacts the second flexible material through openings of the stab-resistant member so that the first flexible material, the second flexible material and the stab-resistant member are integrated together.

2. The sheet-like protective material according to claim 1, further comprising:
   a sheet-like metal mesh that is formed by weaving metal fibers, wherein:
      the plurality of flexible materials includes a third flexible material,
      one of the first flexible material or the second flexible material is placed on a first surface of the metal mesh and the third flexible material is placed on a second surface of the metal mesh opposite the first surface, and
      the one of the first flexible material or the second flexible material contacts the third flexible material through openings of the metal mesh so that the one of the first flexible material or the second flexible material, the third flexible material and the metal mesh are integrated together.

* * * * *